US010283150B2

(12) United States Patent
Contreras et al.

(10) Patent No.: US 10,283,150 B2
(45) Date of Patent: May 7, 2019

(54) SUSPENSION ADJACENT-CONDUCTORS DIFFERENTIAL-SIGNAL-COUPLING ATTENUATION STRUCTURES

(71) Applicant: Western Digital Technologies, Inc., San Jose, CA (US)

(72) Inventors: John Contreras, Palo Alto, CA (US); Rehan Zakai, San Ramon, CA (US); Albert Wallash, Morgan Hill, CA (US); Tzong-Shii Pan, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/667,585

(22) Filed: Aug. 2, 2017

(65) Prior Publication Data
US 2019/0043531 A1 Feb. 7, 2019

(51) Int. Cl.
*G11B 5/48* (2006.01)
*G11B 5/60* (2006.01)
*G11B 5/00* (2006.01)

(52) U.S. Cl.
CPC .............. *G11B 5/486* (2013.01); *G11B 5/607* (2013.01); *G11B 5/6076* (2013.01); *G11B 2005/0024* (2013.01)

(58) Field of Classification Search
None
See application file for complete search history.

(56) References Cited

U.S. PATENT DOCUMENTS

| 5,805,382 | A | * | 9/1998 | Lee et al. | G11B 5/484 360/245.8 |
| 5,871,655 | A | * | 2/1999 | Lee et al. | G11B 5/4853 29/603.16 |
| 7,050,267 | B2 | | 5/2006 | Koh et al. | |
| 7,271,985 | B1 | * | 9/2007 | Buhler et al. | G11B 5/48 360/245.9 |
| 8,553,364 | B1 | * | 10/2013 | Schreiber et al. | G11B 5/486 360/245.9 |
| 9,064,516 | B2 | | 6/2015 | Arai et al. | |
| 9,117,460 | B2 | | 8/2015 | Lahti | |
| 9,117,469 | B1 | | 8/2015 | Contreras et al. | |
| 9,218,834 | B2 | | 12/2015 | Imai et al. | |
| 2005/0180053 | A1 | * | 8/2005 | Dovek et al. | G11B 5/486 360/246 |
| 2005/0280944 | A1 | * | 12/2005 | Yang et al. | G11B 5/486 360/245.9 |

(Continued)

Primary Examiner — Craig A. Renner
(74) Attorney, Agent, or Firm — Jacobsen IP Law—WD

(57) ABSTRACT

Disclosed herein are suspension assembly structures for data storage devices that include physical or virtual crossovers of the pairs of differential signal traces to improve immunity to crosstalk and other interference. In an embodiment, the suspension assembly structure comprises a first trace for carrying a first component of a current to a differential transducer on a slider, a second trace for carrying a second component of the current to the differential transducer on the slider, and third and fourth traces for providing a differential write current to a writer of the data storage device, wherein the first trace physically crosses over the second trace at a first distance from a tail of the suspension assembly structure.

17 Claims, 13 Drawing Sheets

(56) References Cited

U.S. PATENT DOCUMENTS

| | | | |
|---|---|---|---|
| 2007/0115588 A1* | 5/2007 | Amemiya et al. | G11B 5/486 360/234.5 |
| 2011/0292543 A1 | 12/2011 | Miyake | |
| 2012/0275122 A1* | 11/2012 | Howard et al. | H01P 1/184 361/748 |
| 2015/0009591 A1 | 1/2015 | Kagatsume et al. | |
| 2016/0111118 A1 | 4/2016 | Funayama | |

* cited by examiner

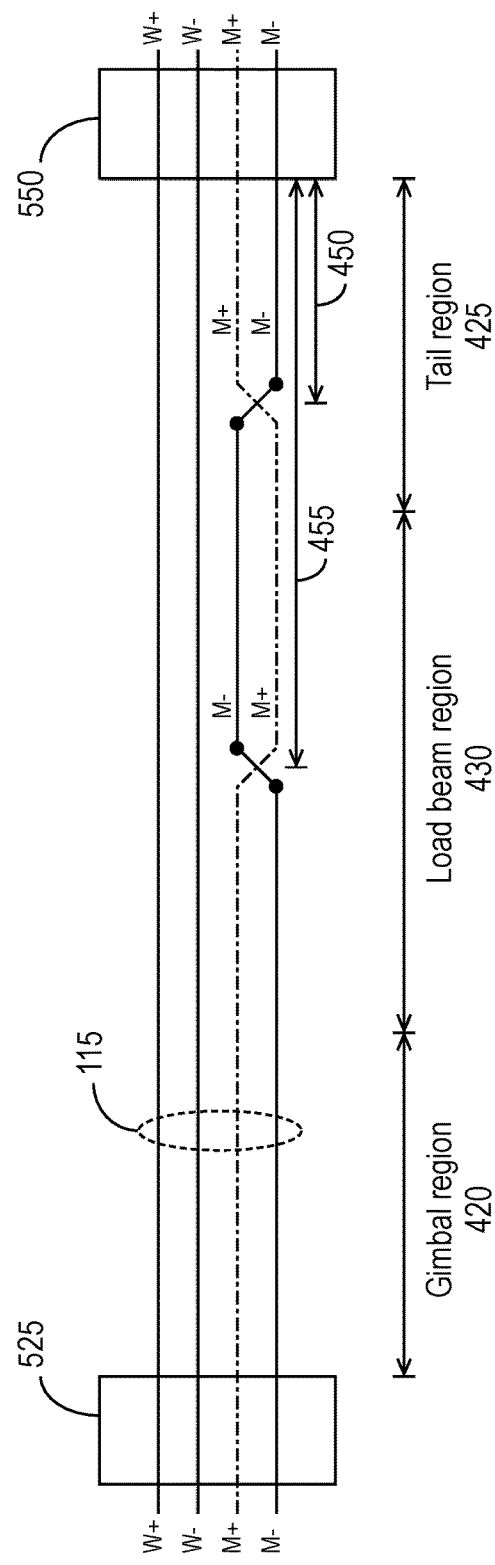

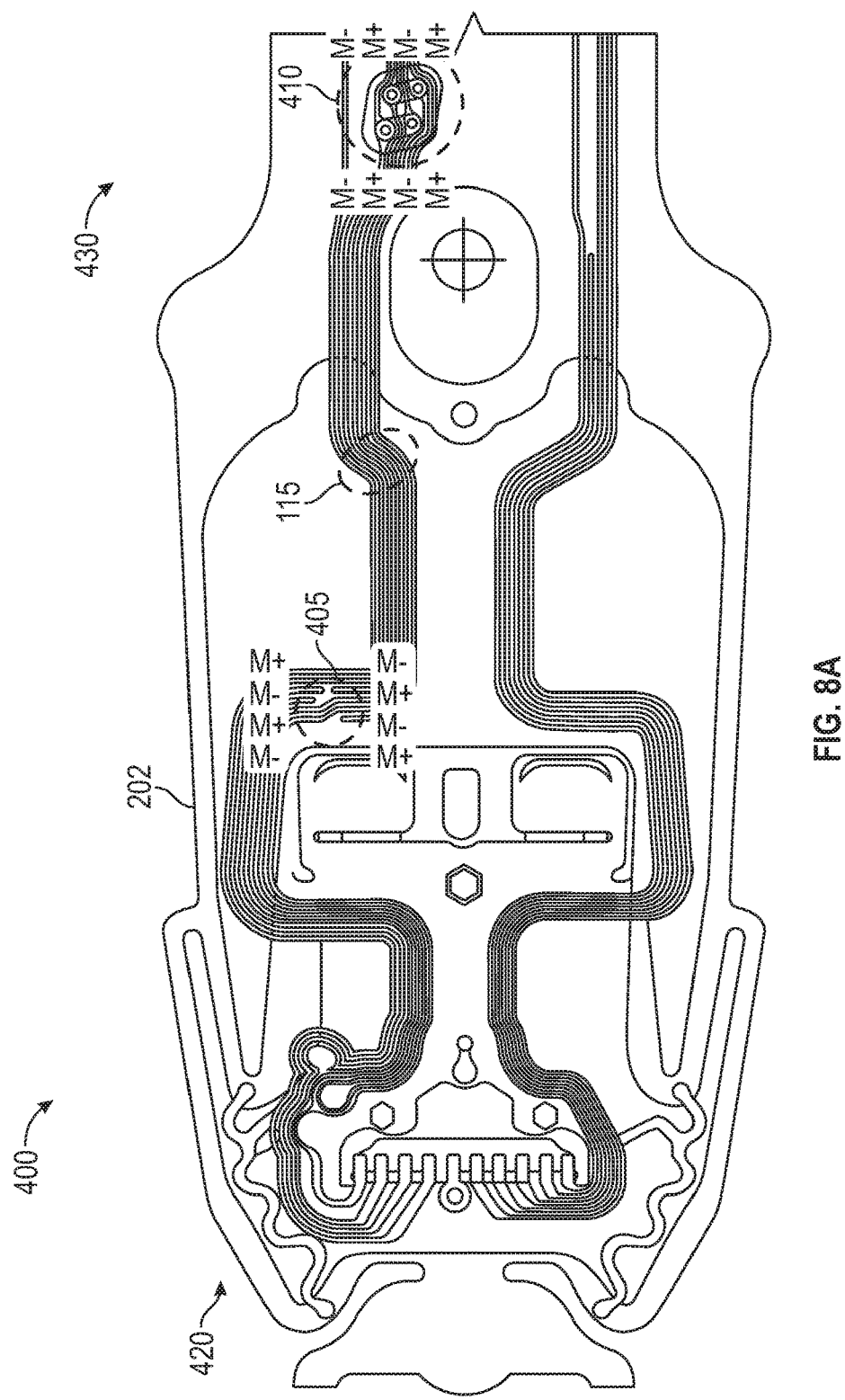

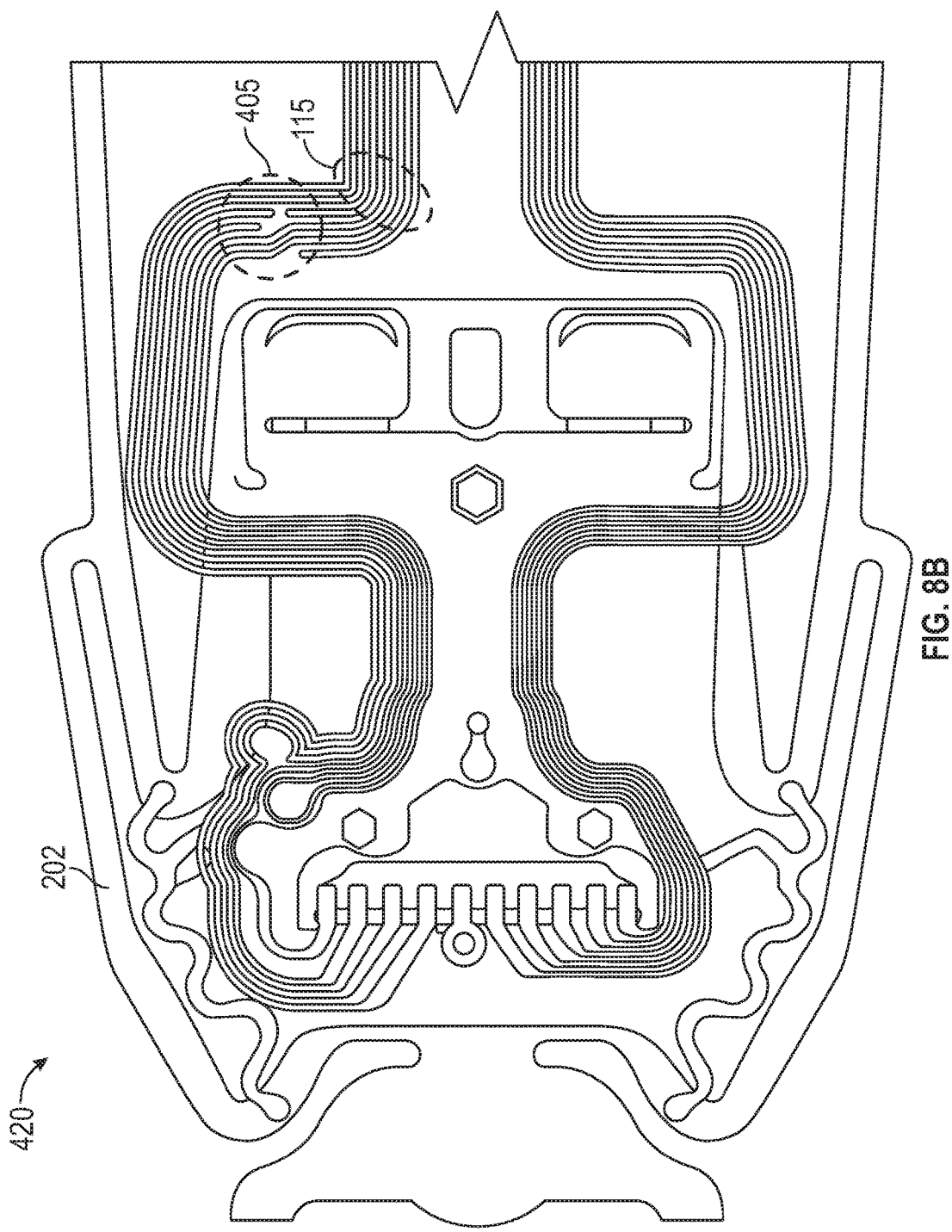

SUSPENSION ADJACENT-CONDUCTORS DIFFERENTIAL-SIGNAL-COUPLING ATTENUATION STRUCTURES

BACKGROUND

Data storage devices, such as hard disk drives, are used to store large quantities of data. A hard disk drive includes a magnetic disk or platter that rotates about a spindle. A suspension of the disk drive includes a load beam and a flexure. The flexure may include a metal base made of a thin stainless steel plate, an insulating layer made of an electrically insulating material formed on the metal base, and a plurality of conductors formed on the insulating layer. The flexure includes a portion that overlaps the load beam and a flexure tail that extends toward the back of a baseplate.

A slider is mounted on a gimbal portion of the suspension located near a distal end of the flexure. The slider includes a magnetic head for reading and/or writing data to the media (e.g., the magnetic disk or platter). In addition, the slider may include one or more components to improve performance or increase areal density capacity. For example, the slider may include a spin-torque oscillator (STO), an embedded contact sensor (ECS), or a thermal fly-height control (TFC) element.

The conductors on the flexure carry currents used for writing or reading to a magnetic medium (e.g., a disk). They may also carry currents used to provide power to and/or control other elements residing on the slider (e.g., STO, ECS, TFC, etc.). Thus, first ends of the conductors are connected to elements on the slider (e.g., the magnetic head, STO, ECS, TFC, etc.), and the other ends of the conductors are connected to tail electrodes formed in the flexure tail. These tail electrodes are electrically connected to terminals of a circuit board, such as a printed circuit board (PCB). The PCB includes a signal processing circuit, such as a preamplifier.

Because at least some of the conductors are in close proximity to each other at some points along the flexure, crosstalk between the various conductors is a concern. For example, write-line-to-read-line crosstalk can overwhelm read signals and result in errors. Generally, crosstalk to and from conductors carrying currents to various elements on a slider can degrade the performance of a hard disk drive.

Therefore, there is an ongoing need for apparatuses and methods to mitigate crosstalk between conductors carrying currents to elements on sliders.

SUMMARY

Disclosed herein are suspension assembly structures that mitigate crosstalk between traces carrying currents to different transducers of a slider by physically and/or virtually "twisting" the traces to provide at least some of the benefits of a twisted pair. Also disclosed are data storage devices comprising such suspension assembly structures.

In one embodiment, a suspension assembly structure for a data storage device comprises a first trace for carrying a first component of a current to a differential transducer on a slider, a second trace for carrying a second component of the current to the differential transducer on the slider, and third and fourth traces for providing a differential write current to a writer of the data storage device. The first trace physically crosses over the second trace at a first distance from a tail of the suspension assembly structure. In some embodiments, the first trace also physically crosses over the second trace at a second distance from the tail of the suspension assembly structure.

In some embodiments, the differential transducer is a spin-torque oscillator (STO), and the current is a STO bias current. In some embodiments in which the differential transducer is a STO, the STO bias current may comprise an AC component.

In some embodiments, the differential transducer is a read sensor, and the current is a read sensor current. In other embodiments, the differential transducer is an embedded contact sensor or a thermal fly-height control element.

In some embodiments, the suspension assembly structure also includes a fifth trace for carrying the first component of the current to the differential transducer on the slider and a sixth trace for carrying the second component of the current to the differential transducer on the slider. In some such embodiments, the fifth trace physically crosses over the sixth trace at a second distance from the tail of the suspension assembly structure, the first trace is connected to the fifth trace at a third distance from the tail of the suspension assembly structure, and the second trace is connected to the sixth trace at a fourth distance from the tail of the suspension assembly structure. In some embodiments, the first and second distances are substantially equal, and the third and fourth distances are substantially equal. In some embodiments, the first and second distances are less than the third and fourth distances.

In some embodiments including fifth and sixth traces, a length of the first trace is less than a length of the fifth trace, and a length of the sixth trace is less than a length of the second trace. In some embodiments including fifth and sixth traces, the first trace virtually crosses the second trace at a fifth distance from the tail of the suspension assembly structure, and the fifth trace virtually crosses the sixth trace at a sixth distance from the tail of the suspension assembly structure.

In some embodiments including fifth and sixth traces, the fifth and sixth distances are substantially equal. In some embodiments including fifth and sixth traces, the first, second, third, and fourth distances are less than the fifth and sixth distances. In some embodiments including fifth and sixth traces, a length of the first trace is less than a length of the fifth trace, and a length of the sixth trace is less than a length of the second trace.

In some embodiments, a suspension assembly structure for a data storage device comprises a gimbal region, a load beam region, a tail region, and a plurality of differential transducer traces for providing a current to a differential transducer on a slider, the plurality of differential transducer traces including at least four traces. In such embodiments, a first subset of at least two of the plurality of differential transducer traces is for carrying a first component of the current, and a second subset of at least two others of the plurality of differential transducer traces is for carrying a second component of the current. The first subset of the plurality of differential transducer traces physically crosses over the second subset of the plurality of differential transducer traces in the tail region, the first subset of the plurality of differential transducer traces are strapped together in the load beam region, and the second subset of the plurality of differential transducer traces are strapped together in the load beam region.

In some embodiments, the first subset of the plurality of differential transducer traces virtually crosses the second subset of the plurality of differential transducer traces in the gimbal region.

In some embodiments, the differential transducer is a spin-torque oscillator (STO), and the current is a STO bias current (e.g., an bias current with an AC component). In some embodiments, the differential transducer is a read sensor, an embedded contact sensor, or a thermal fly-height control element.

BRIEF DESCRIPTION OF THE DRAWINGS

Objects, features, and advantages of the disclosure will be readily apparent from the following description of certain embodiments taken in conjunction with the accompanying drawings in which:

FIG. 5A illustrates a suspension assembly structure for a data storage device in accordance with some embodiments.

FIG. 8A illustrates a suspension assembly that includes virtual crossovers in accordance with some embodiments.

FIG. 8B is a closer view of the gimbal region and the virtual crossovers of FIG. 8A.

To facilitate understanding, identical reference numerals have been used, where possible, to designate elements that are common to the figures. It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim.

Figure 1:
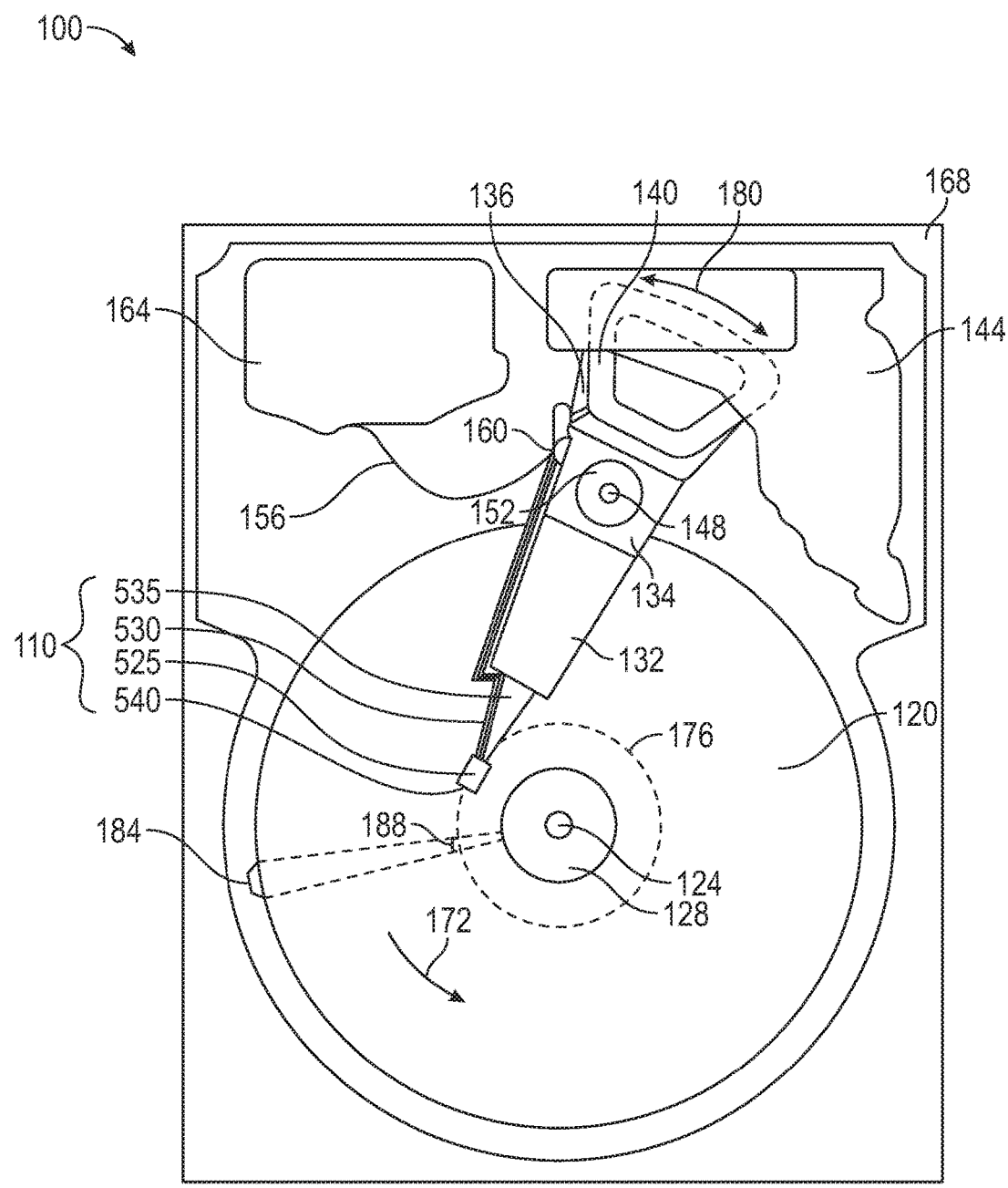
FIG. 1 is a plan view illustrating a hard disk drive that may include one or more of the embodiments disclosed herein.

FIG. 1 is a plan view illustrating an example of a data storage device, namely a hard disk drive (HDD) 100, that may include one or more of the embodiments disclosed herein. FIG. 1 illustrates an example of the functional arrangement of components of the HDD 100, including a slider 525 that includes a magnetic recording head 540. The head 540 includes a write element and a read element for respectively writing and reading information stored on a media 120 of the HDD 100. The HDD 100 includes at least one head gimbal assembly (HGA) 110, which includes the slider 525, a suspension 530 attached to the slider 525, and a load beam 535 attached to the suspension 530. The HDD 100 also includes at least one magnetic-recording media 120 rotatably mounted on a spindle 124 and a drive motor (not shown) attached to the spindle 124 for rotating the media 120. The media 120, which may include a plurality of disks, may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134, and a stator 144 including a voice-coil magnet. The armature 136 of the VCM is attached to the carriage 134 and is configured to move the arm 132 and the HGA 110 to access portions of the media 120. The carriage 134 is mounted on a pivot-shaft 148 with an interposed pivot-bearing assembly 152. In the case of a HDD having multiple disks (also sometimes referred to as "platters"), the carriage 134 may be called an "E-block," or comb, because the carriage 134 is arranged to carry a ganged array of arms 132 that gives it the appearance of a comb.

An assembly comprising a head gimbal assembly (e.g., HGA 110), including a suspension flexure to which the slider 525 is coupled, an actuator arm (e.g., arm 132) to which the suspension is coupled, and an actuator (e.g., the VCM) to which the actuator arm is coupled, may be collectively referred to as a head stack assembly (HSA). The HSA also includes a suspension tail. Generally, a HSA is the assembly configured to move the slider 525 to enable the head 540 to access portions of the media 120 (e.g., magnetic-recording disks) for read and write operations.

In accordance with some embodiments, electrical signals (for example, current to the voice coil 140 of the VCM, write signals to and read signals from the head 540, etc.) are provided by a flexible interconnect cable 156 ("flex cable"). Interconnection between the flex cable 156 and the head 540 may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feed-throughs provided by a HDD housing 168. The HDD housing 168, in conjunction with a HDD cover (not shown), provides a sealed, protective enclosure for the information storage components of the HDD 100.

In accordance with some embodiments, other electronic components, including a disk controller and servo electronics such as a digital-signal processor (DSP), provide electrical signals to the drive motor, the voice coil 140 of the VCM, and the head 540 of the HGA 110. The electrical signal provided to the drive motor enables the drive motor to spin, thereby providing a torque to the spindle 124, which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 525 rides so that the slider 525 flies above the surface of the media 120 without making contact with a thin magnetic-recording medium of the media 120 in which information is recorded.

The electrical signal provided to the voice coil 140 of the VCM enables the head 540 of the HGA 110 to access a track 176 on which information is recorded. Thus, the armature 136 of the VCM swings through an arc 180, which enables the HGA 110 attached to the armature 136 by the arm 132 to access various tracks on the media 120. Information is stored on the media 120 in a plurality of sectored tracks arranged in sectors on the media 120, for example, sector 184. Correspondingly, each track is composed of a plurality of sectored track portions, for example, sectored track portion 188. Each sectored track portion 188 includes recorded data and a header containing a servo-burst-signal pattern, for example, an ABCD-servo-burst-signal pattern, information that identifies the track 176, and error correction code information. In accessing the track 176, the read element of the head 540 of the HGA 110 reads the servo-burst-signal pattern, which provides a position-error-signal (PES) to the servo electronics, which controls the electrical signal provided to the voice coil 140 of the VCM, enabling the head 540 to follow the track 176. Upon finding the track 176 and identifying a particular sectored track portion 188, the head 540 either reads data from the track 176 or writes data to the track 176, depending on instructions received by the disk controller from an external agent, for example, a microprocessor of a computer system to which the HDD 100 is connected.

For reading the information stored on the media 120, the head 540 may include only one read sensor, or it may include multiple read sensors. The read sensor(s) in the head 540 may include, for example, one or more giant magnetoresistance (GMR) sensors, tunneling magnetoresistance (TMR) sensors, or another type of magnetoresistive sensor. When the slider 525 passes over a track 176 on the media 120, the head 540 detects changes in resistance due to magnetic field variations recorded on the media 120, which represent the recorded bits.

In some embodiments, the slider 525 and/or head 540 also include additional elements or components that may improve read/write performance. For example, the need to increase storage densities has led to the development of technologies such as microwave-assisted magnetic recording (MAMR). In MAMR systems, a spin-torque oscillator (STO) is placed within the write gap of the head 540, and a bias current is supplied to the STO. In operation, the head 540 generates a write field that, beneath the main pole, is substantially perpendicular to the magnetic recording layer of the media 120, and the STO generates a high-frequency auxiliary field to the recording layer. Ideally, the auxiliary field has a frequency close to the resonance frequency of the magnetic grains in the recording layer to facilitate the switching of the magnetization of the grains. As a consequence, the oscillating field of the STO resonates the magnetic recording components (e.g., head or media), which aids with magnetic precession for the material's magnetic orientation switching efficiency. In addition, the STO's auxiliary field may also be used for write field enhancement with the STO mounted near the pole tip of the head 540. To generate the auxiliary write field, the STO requires the application of a bias voltage (or current) that affects the write transducer's pole potential. Prior art systems used DC voltages (or currents) to bias the STO, but more recently-developed systems use STO bias voltages (or currents) that have AC components.

Another example of an element that may be included in a HDD 100 is a thermal fly-height control (TFC) element. Some modern disk drives use a slider 525 equipped with a heater that heats the portion of the slider 525 on which the head 540 is mounted to reduce the distance between the head 540 and the media 120 as the slider flies over the media 120. A TFC element supplies the heater with electric current to generate heat that causes the portion of the slider 525 on which the head 540 is mounted to protrude by thermal expansion, which leads to decreased clearance between the media 120 and the head 540.

Another example of an element that may be included in a slider 525 is an embedded contact sensor (ECS). The distance between the slider 525 and the media 120 may be detected based on mechanical vibration of the slider 525, and the fly-height of the slider 525 can then be adjusted to attempt to optimize performance while avoiding contact with the media 120. Temperature changes sensed by an ECS included in the slider 525 may be used as an indicator of contact and/or near contact between the slider 525 and the media 120. An ECS may sense physical contact of the slider with the media 120 based on the ECS's resistance, e.g., the amount of voltage across the ECS, which is affected by the temperature change caused by such physical contact or proximity.

In addition to the read and write elements of the head 540, these additional elements of the slider 525 or head 540, if present, are controlled through signals (e.g., currents) generated by electronics on the HDD 100, such as, for example, AE module 160 or another component. Typically, the signals are provided by differential currents carried by two conductors. Thus, the presence of additional components on the slider 525 (including those integrated in the head 540) increases the number of conductors connecting the control electronics of the HDD 100 to the slider 525.

Figure 2:
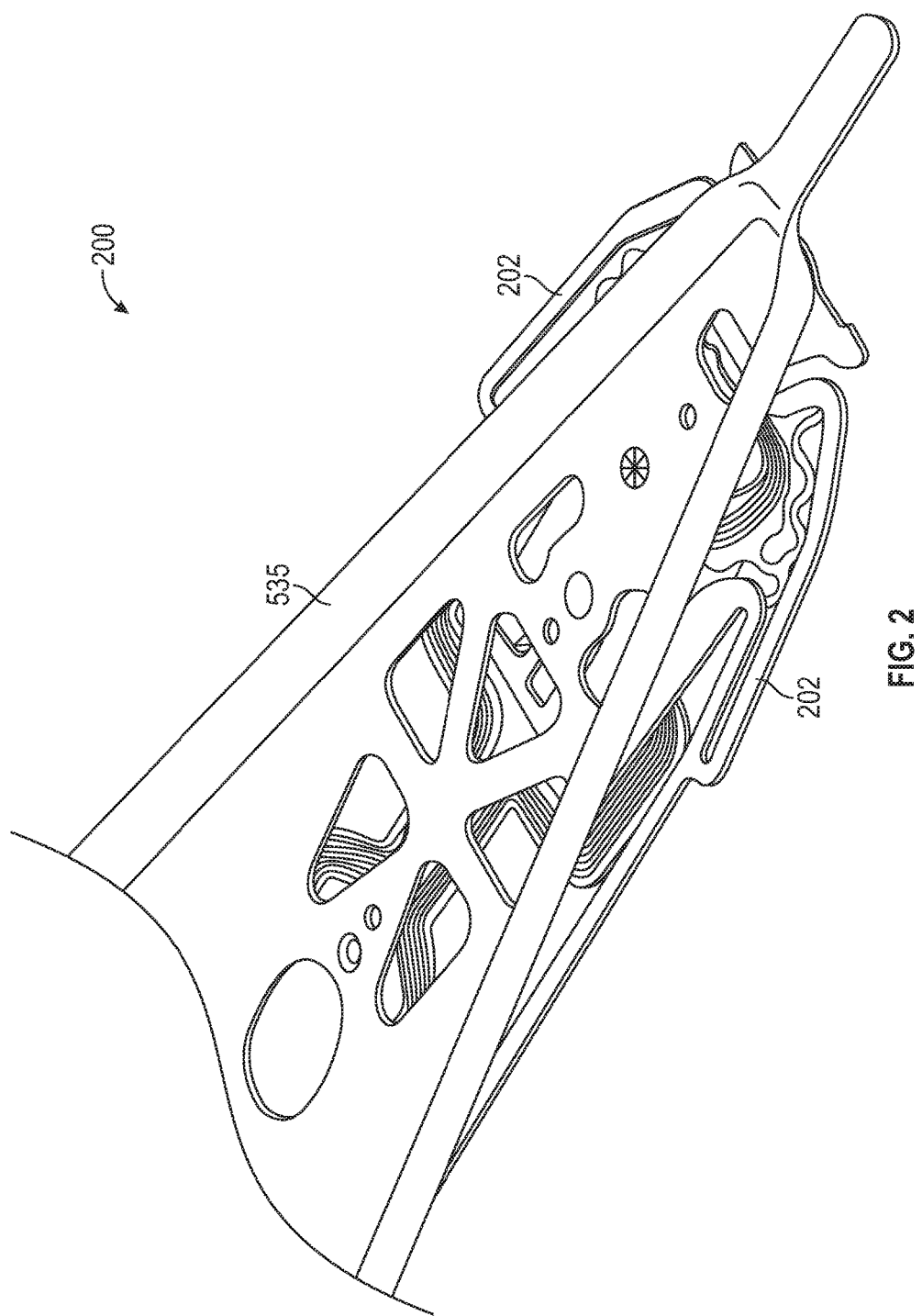
FIG. 2 is a perspective view illustrating a head gimbal assembly that may be used in conjunction with some embodiments.

FIG. 2 is a perspective view illustrating a HGA 200 that may be used in conjunction with some embodiments. The HGA 200 comprises a flexure 202 and a load beam 535. The flexure 202 provides gimbaled support for the slider 525 so that the head 540 can pitch and roll in order to adjust its orientation. The flexure 202 may be made out of a laminated multilayer material. In some embodiments, the flexure 202 comprises multiple assembled layers, including (1) a support layer made of, for example, steel; (2) an insulator (or "insulating") layer, which may be, for example, polyimide; (3) a conductor layer; and (4) a cover layer (e.g., polyimide) that insulates the conductor layer. Electrical lead lines, also referred to herein as conducting lines or traces, are etched into the conductor layer, while the insulator layer insulates the lead lines from the underlying support layer. The support layer may be patterned to provide strength and gimbaling characteristics to the flexure 202. The conducting lines electrically connect the elements on the slider 525 (e.g., the head 540 and any additional elements on the slider 525, such as, for example, an STO, ECS, or TFC) to the read/write electronics (e.g., AE module 160) and are often routed on both sides of the suspension, especially in the gimbal region. The conducting lines may be made of copper conductor for providing electrical function.

Figure 3:
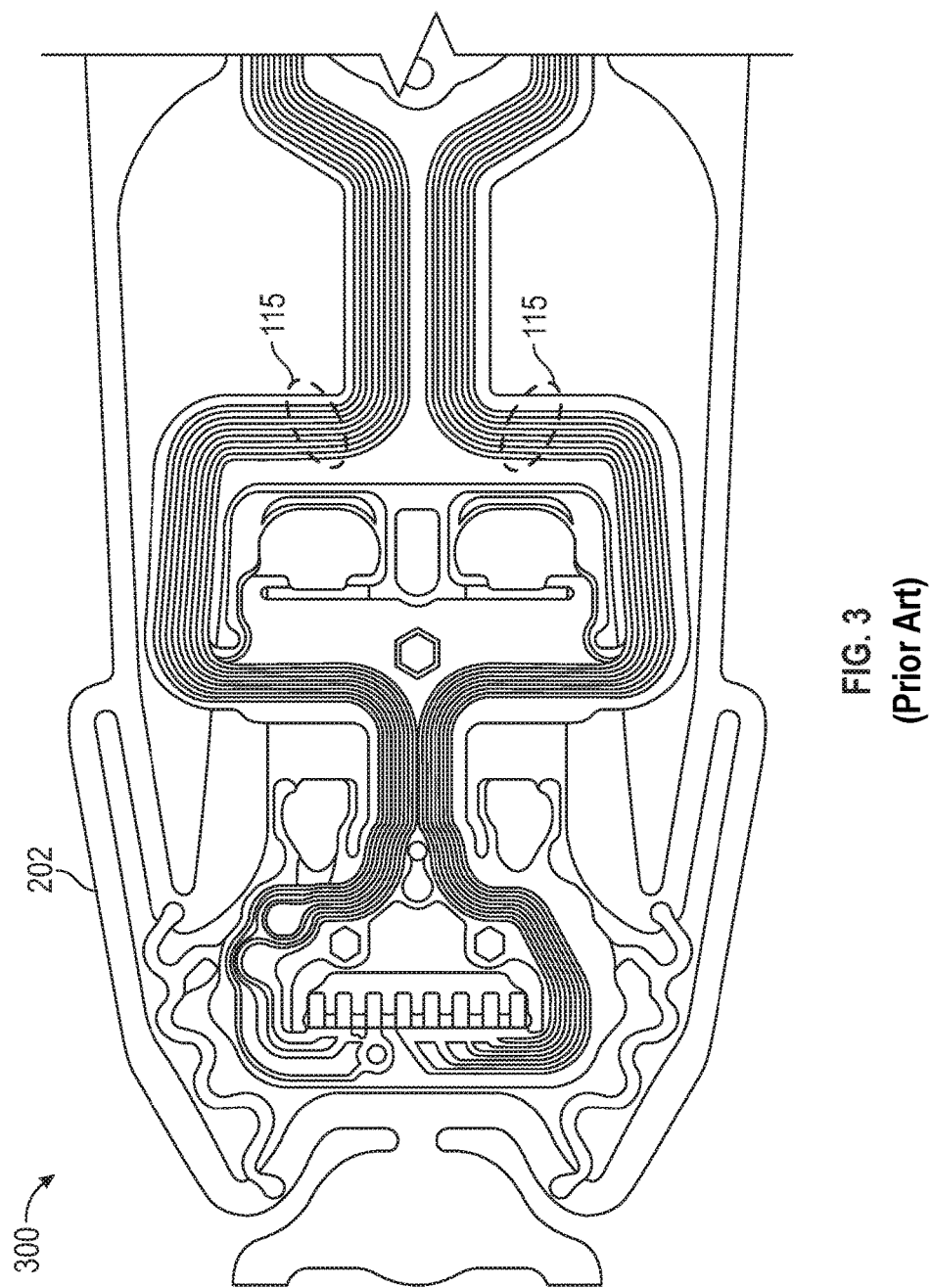
FIG. 3 is a bottom plan view illustrating a prior-art flexure gimbal assembly.

FIG. 3 is a bottom plan view illustrating a prior-art flexure gimbal assembly 300. FIG. 3 illustrates the assembly with the slider 525 omitted. Because the flexure gimbal assembly 300 has limited space for the traces 115, as illustrated in FIG. 3, the traces 115 reside close to each other at various points along the flexure gimbal assembly 300. Consequently, crosstalk can occur between different elements' traces 115. For example, the traces 115 supplying the write current to a STO-equipped head 540 may cause crosstalk into the traces 115 supplying a bias current to the STO. The crosstalk can have a severe impact on the performance reliability of the STO and in extreme cases can damage the STO. When the STO bias current has only a DC component, crosstalk may be mitigated using a capacitor across the STO bias current traces to filter crosstalk caused by the write traces 115. But when the STO bias current has a high-frequency AC component, use of a capacitor is precluded because the STO bias current switches faster than the write current (e.g., at roughly twice the rate of the write current). Thus, a capacitor that would mitigate crosstalk would also effectively block the AC component of the STO bias current.

Disclosed herein are novel suspension assembly structures that mitigate crosstalk between traces carrying currents to different transducers of a slider 525 by physically and/or virtually "twisting" the traces to provide at least some of the benefits of a twisted pair. In certain instances, the disclosed structures provide more than 13 dB of crosstalk mitigation in HDD applications.

Figure 4:
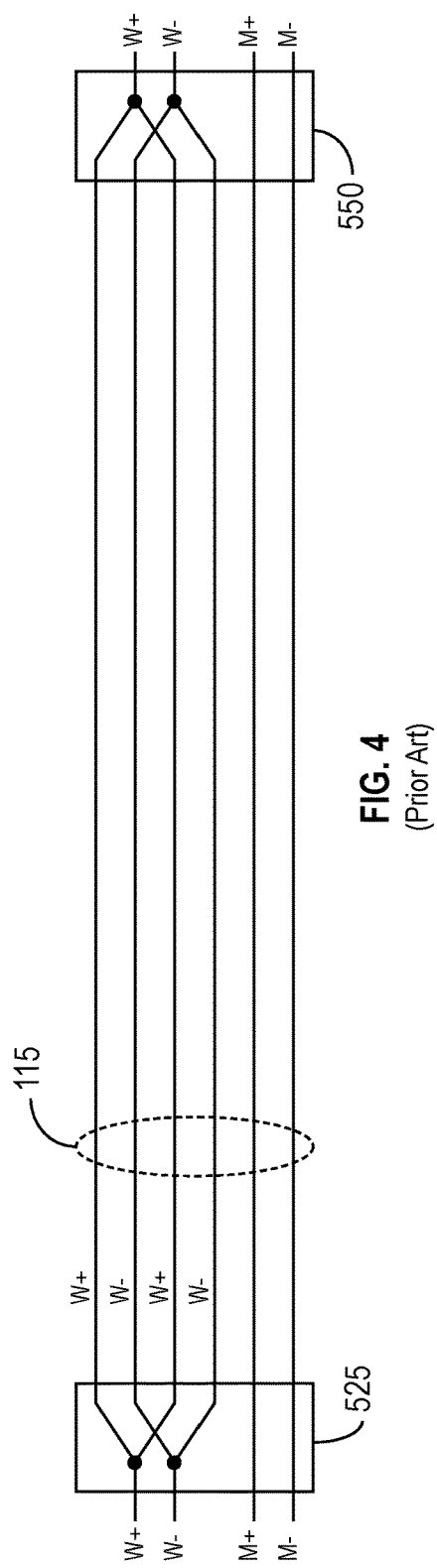
FIG. 4 illustrates a prior-art suspension in which a number of traces connect a slider to a suspension tail.

FIG. 4 illustrates a prior-art implementation of a suspension assembly in which a number of traces 115 connect a slider 525 to a suspension tail 550. Four write traces 115, labeled W+ and W−, are connected between the slider 525 and the suspension tail 550. The write traces W+ and W− are interleaved as shown in FIG. 4 because for low-power operation, the characteristic impedance (i.e., $Z_0=\text{sqrt}(L/C)$) of the suspension is preferably relatively low. Interleaving multiple traces lowers the characteristic impedance by decreasing the coupling inductance (L) and increasing the coupling capacitance (C). It is to be understood that, as described and illustrated in various drawings herein, traces 115 (whether write traces W+ and W− or differential transducer traces M+ and M−) may or may not be interleaved (i.e., each trace split into two traces). The write traces W+ and W− carry the differential components of a write current to the writer of head 540. In addition, two differential transducer traces 115, labeled M+ and M−, are connected between the slider 525 and the suspension tail 550. The differential transducer traces M+ and M− carry a differential current to a differential transducer (e.g., read sensor, STO, ECS, TFC, etc.) on the slider 525. In the configuration illustrated in FIG. 4, the write traces W+ and W− may cause crosstalk in the differential transducer traces M+ and M−, or vice versa. As explained previously, this crosstalk can have deleterious effects on performance of the storage device.

FIG. 5A illustrates a suspension assembly structure for a data storage device in accordance with some embodiments. In the embodiment of FIG. 5A, none of the traces 115 are interleaved. As illustrated in FIG. 5A, the differential transducer traces M+ and M−, which are presumed to be susceptible to crosstalk from the write traces W+ and W−, cross over each other at various locations along the suspension. In the embodiment of FIG. 5A, the differential transducer traces M+ and M− physically cross over each other twice: once in the gimbal region 420 and once in the tail region 425. (It is to be understood that the term "cross over" is used herein to mean that one trace 115 passes over or under another trace 115 but remains electrically isolated from it. Thus, a first trace 115 is said to "cross over" a second trace 115 when the first trace 115 passes over the second trace 115 as well as when the first trace 115 passes under the second trace 115. Thus, the term "crosses over" includes the case where the trace 115 that is said to "cross over" is itself crossed over by another trace 115.) The physical crossovers may be accomplished, for example, using vias and/or stainless steel jumpers. The physical crossovers effectively twist the differential transducer traces M+ and M−, and this twisting mitigates crosstalk coupling into the traces from the write traces W+ and W−.

FIG. 5A illustrates two crossover points, one at a first distance 450 from the tail 550, and a second at a second distance 455 from the tail 550, where "distance" in this context refers to the length of the trace(s) 115 (e.g., M+ and M−) between the crossover location and the suspension tail 550, which may not be the same as the geometric distance between the suspension tail 550 and the crossover point. It is to be appreciated that as few as one crossover may be used (e.g., an embodiment may include only the physical crossover in the tail region 425 or the physical crossover in the load beam region 430). Moreover, additional crossovers may be included in the gimbal region 420, the load beam region 430, or the tail region 425. As explained below, crossovers in the gimbal region 420 may be implemented differently than the crossovers shown in FIG. 5A.

Figure 5B:
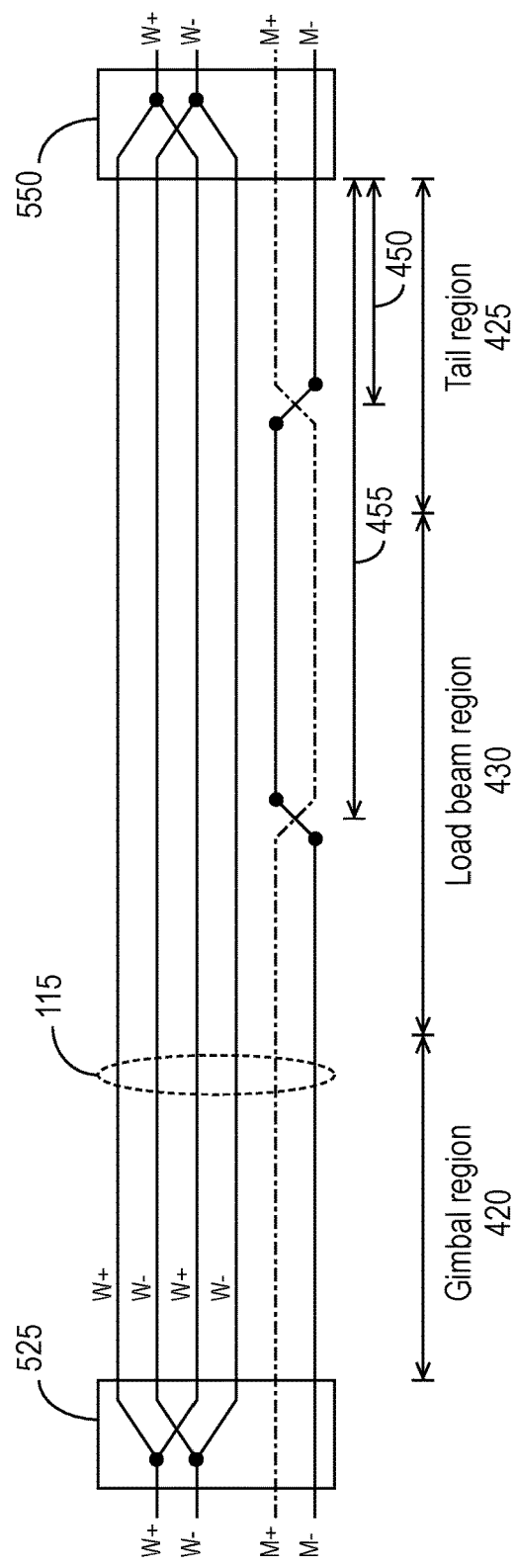
FIG. 5B illustrates another suspension assembly structure for a data storage device in accordance with some embodiments.

FIG. 5B illustrates another suspension assembly structure for a data storage device in accordance with some embodiments. As illustrated in FIG. 5B, each of the write traces W+ and W− is split into two traces 115 (e.g., to reduce the characteristic impedance and thereby enable low-power operation). As in FIG. 5A, to mitigate crosstalk from the write traces W+ and W−, the differential transducer traces M+ and M− cross over each other along the suspension. In the embodiment of FIG. 5B, the differential transducer traces M+ and M− cross over each other twice: once in the gimbal region 420 and once in the tail region 425. Like FIG. 5A, FIG. 5B illustrates two cross-over points, one at a first distance 450 from the tail 550, and a second at a second distance 455 from the tail 550. Again, it is to be appreciated that as few as one crossover may be used (e.g., an embodiment may include only the crossover in the tail region 425 or the crossover in the load beam region 430). Moreover, additional crossovers may be included in the gimbal region 420, the load beam region 430, or the tail region 425. As explained below, crossovers in the gimbal region 420 may be implemented differently than the crossovers shown in FIG. 5B.

It is to be understood that the labeling of the traces in FIG. 5A and other figures herein presumes that the write traces W+ and W− cause crosstalk to the differential transducer traces M+ and M−. This presumption is arbitrary in that the differential transducer traces M+ and M− could cause crosstalk to the write traces W+ and W−, in which case the labels M+ and W+ would be reversed, as would the labels M− and W−.

Figure 6A:
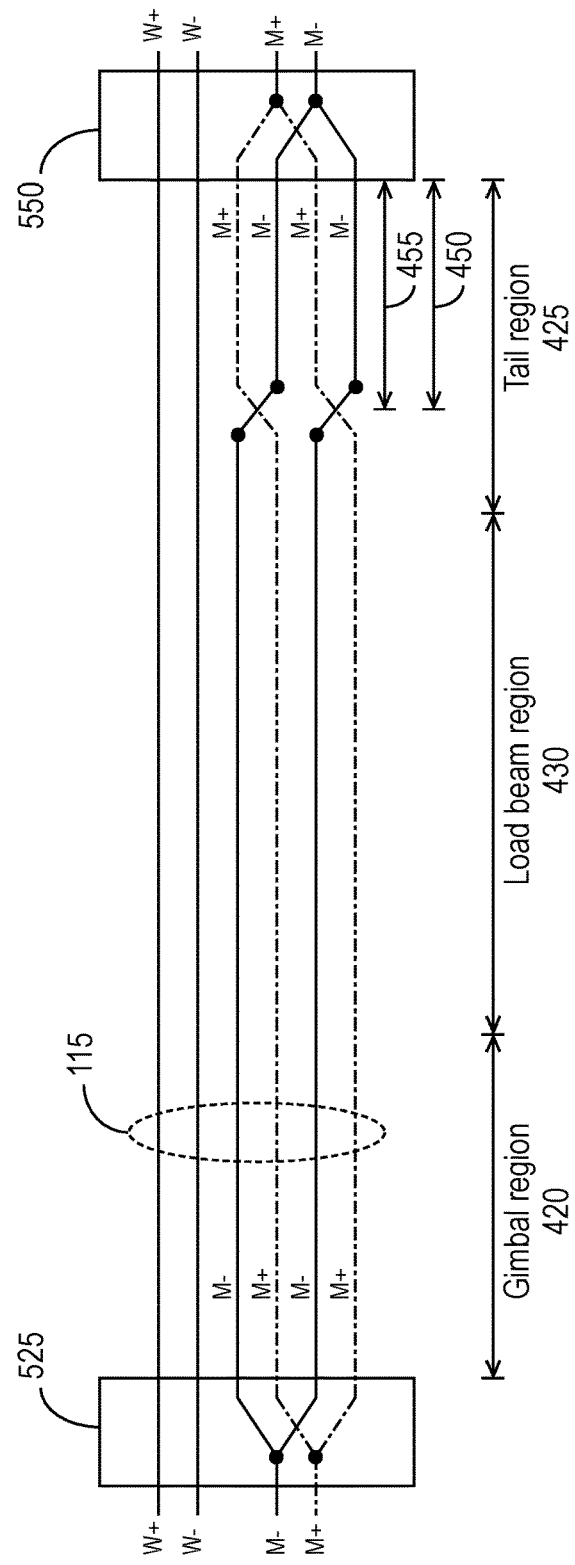
FIG. 6A illustrates another suspension assembly structure for a data storage device in accordance with some embodiments.

FIG. 6A illustrates another suspension assembly structure for a data storage device in accordance with some embodiments. As illustrated in FIG. 6A, each of the differential transducer traces M+ and M− is split into two traces 115 (M+, M+ and M−, M−). As illustrated in FIG. 6A, one of the differential transducer traces M+ crosses over one of the differential transducer traces M− at a distance 450 from the tail 550, and the other of the differential transducer traces M+ crosses over the other of the differential transducer traces M− at a distance 455 from the tail 550. In some embodiments, such as the embodiment of FIG. 6A, the distances 450 and 455 are substantially equal (where, again, "distance" means trace length).

FIG. 6A illustrates a first physical crossover for a first differential transducer trace M+ and a second differential transducer trace M− at a first distance 450 from the tail 550, and a second physical crossover for a third differential transducer trace M+ and a fourth differential transducer trace M− at a second distance 455 from the tail 550. It is to be appreciated that the first differential transducer trace M+ and the second differential transducer trace M− may cross over each other more than once between the tail 550 and the slider 525. Likewise, the third differential transducer trace M+ and the fourth differential transducer trace M− may cross over each other more than once between the tail 550 and the slider 525. Additional crossovers may be included in the gimbal region 420, the load beam region 430, or the tail region 425. As explained below, crossovers in the gimbal region 420 may be implemented differently than the crossovers shown in FIG. 6A. Physical crossovers, as opposed to the virtual crossovers discussed below for the gimbal region 420, are implemented in the load beam region 430 and the tail region 425 by utilizing the supporting stainless-steel backing, which supports a via crossover through the stainless-steel backing.

Figure 6B:
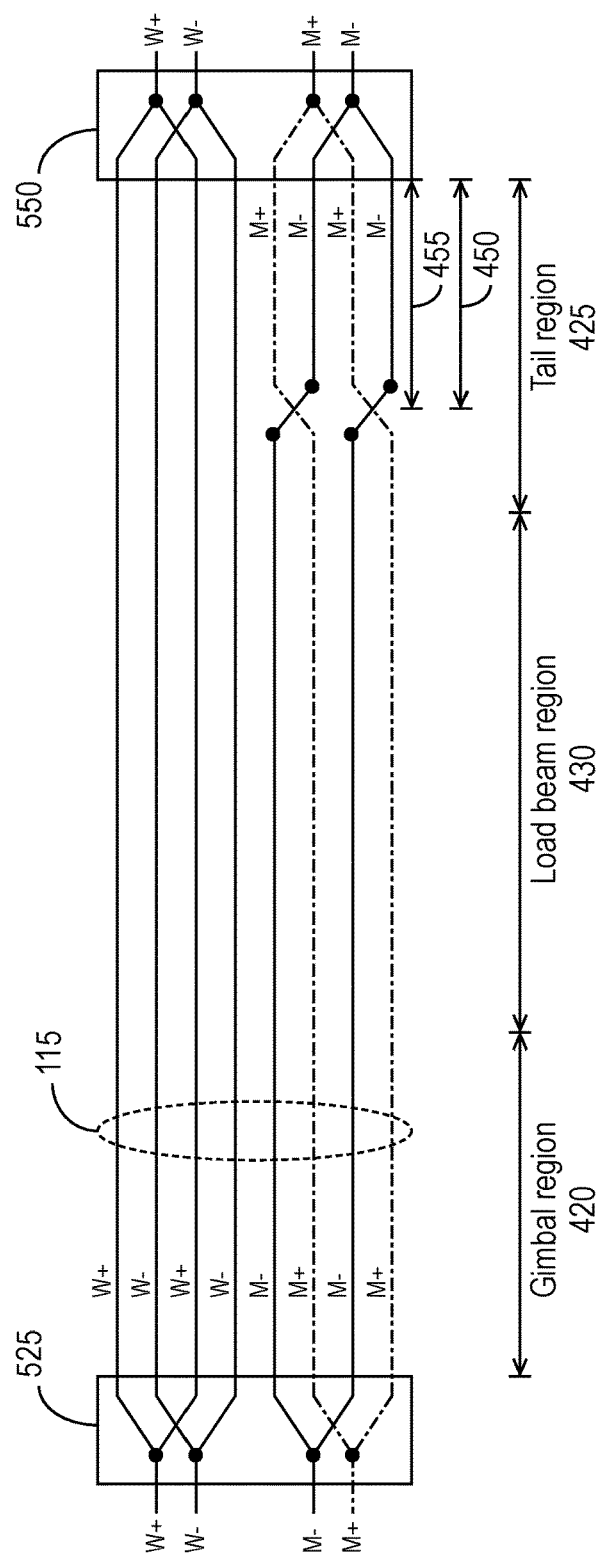
FIG. 6B illustrates another suspension assembly structure for a data storage device in accordance with some embodiments.

FIG. 6B illustrates another suspension assembly structure for a data storage device in accordance with some embodiments. The embodiment illustrated in FIG. 6B is similar to that shown in FIG. 6A, except that each of the write traces W+ and W− is split into two traces 115 (again, to reduce the characteristic impedance and thereby facilitate low-power operation).

Figure 7A:
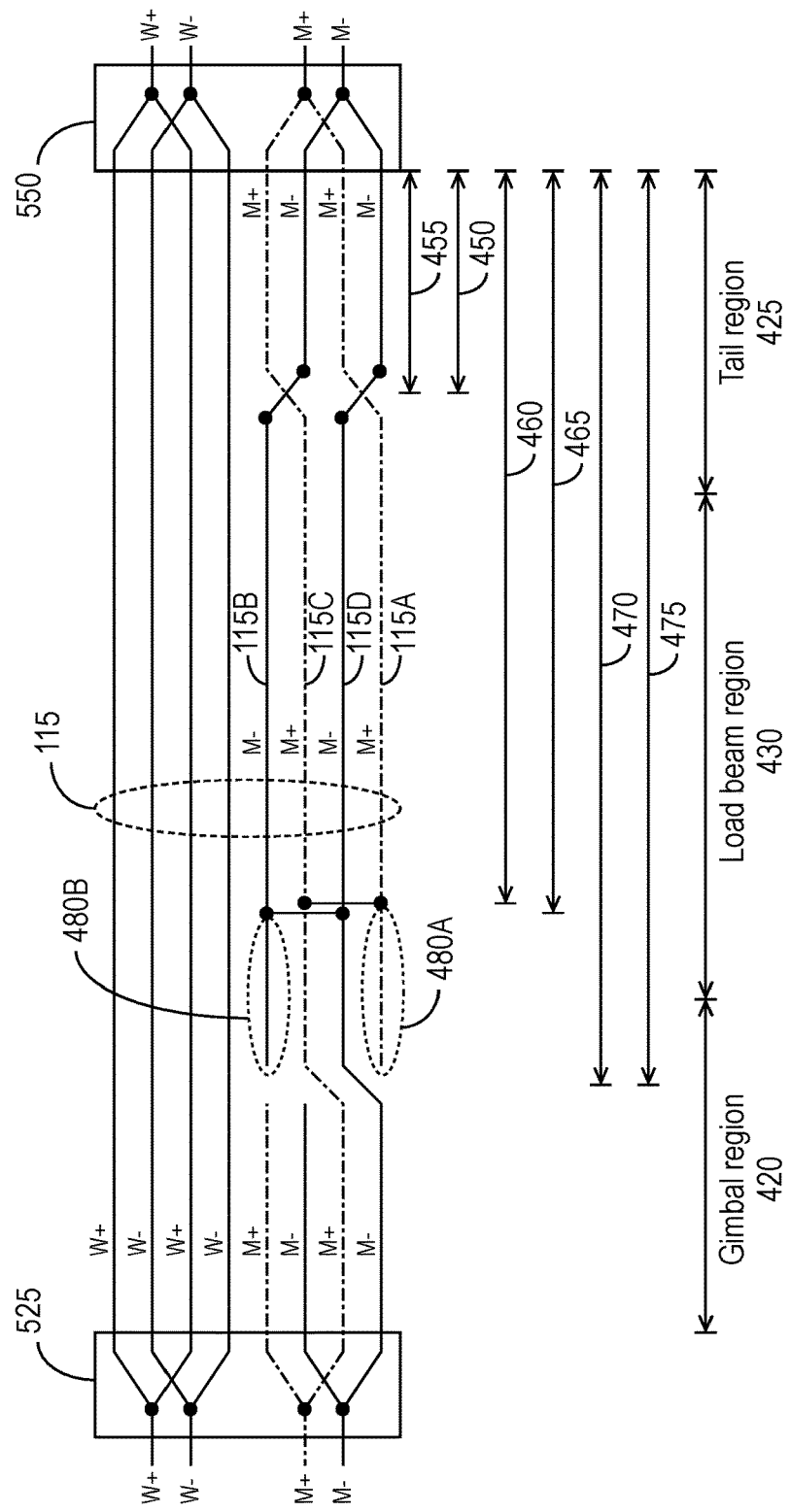
FIG. 7A illustrates another suspension assembly structure for a data storage device in accordance with some embodiments.

FIG. 7A illustrates another suspension assembly structure for a data storage device in accordance with some embodiments. The gimbal region 420 may have structural constraints or properties that prevent traces 115 from being physically crossed over each other, e.g., using vias. For example, the gimbal region 420 may not have enough room to accommodate physical crossovers, or the use of physical crossovers may compromise the flexibility of the gimbal region 420. Flexibility of the gimbal region 420 is desirable to allow the suspension to have sufficient pliability to allow the slider 525 to fly smoothly over the surface of the media 120. Therefore, in the example of FIG. 7A, the gimbal region 420 includes what is referred to herein as a "floating crossover" or "virtual crossover," which is designed to provide characteristics that are similar to those provided by a physical crossover. Instead of physically crossing the traces 115 (e.g., M+ and M−), a first differential transducer trace M+, labeled 115A, and a second differential transducer trace M−, labeled 115B, are severed in the gimbal region 420 at, respectively, distances 470 and 475 from the tail 550. In some embodiments, the distances 470 and 475 are substantially equal. As shown in FIG. 7A, the first differential transducer trace 115A is strapped to a third differential transducer trace M+, labeled 115C, in the load beam region 430 at a distance 460 from the tail 550. Likewise, the second differential transducer trace 115B is strapped to a fourth differential transducer trace M−, labeled 115D, in the load beam region 430 at a distance 465 from the tail 550. In some embodiments, the distances 460 and 465 are substantially equal. In the configuration shown in FIG. 7A, the first differential transducer trace 115A and the fourth differential transducer trace 115D "virtually cross over" each other in the gimbal region 420, and, likewise, the third differential transducer trace 115C and the second differential transducer trace 115B virtually cross over each other in the gimbal region 420.

As shown in FIG. 7A, the floating crossover structure results in each of the first differential transducer trace 115A and the second differential transducer trace 115B having, respectively, the open stubs 480A and 480B. In some embodiments, the lengths of the stubs 480A and 480B are substantially equal. The lengths of the stubs 480A, 480B may be tuned so that they resonate at frequencies outside of the frequency band being used for signaling. In this case, the stubs 480A, 480B may be left open (e.g., floating or unterminated) without affecting the signals carried by the differential transducer traces 115A-115D. The strapping of the first and third differential transducer traces 115A, 115C and the fourth and second differential transducer traces 115D, 115B mitigates resonance in the gimbal region 420 by mitigating or preventing standing waves.

An example illustrates how the lengths of the stubs 480A, 480B may be selected. If the differential transducer traces 115A, 115B, 115C, and 115D carry data signals at frequencies of 3-5 GHz, the lengths of the stubs 480A, 480B can be selected so that they resonate at 10 GHz or above. Denoting the lengths of the stubs 480A, 480B as LS (in meters) and the data signal frequency as DSF, the following equation may be used to calculate LS: $DSF \ll v/(4 \times LS)$, where v is the propagation velocity of the interconnect. If $v=2 \times 10^8$ m/s (which may be typical), and DSF is in the range of 3-5 GHz, selecting LS=0.004 m results in a resonant frequency of approximately 12.5 GHz. Therefore, in this example, if LS is chosen to be less than about 0.004 m, the stubs 480A, 480B may be left open without substantially affecting the data signals. It is to be understood that 0.004 m is not a limit on the maximum length of the stubs 480A, 480B, and other values may also be suitable for the lengths of the stubs 480A, 480B.

As shown in FIG. 7A, in addition to the first and fourth differential transducer traces 115A, 115D virtually crossing over each other and the second and third differential transducer traces 115B, 115C virtually crossing over each other, the first differential transducer trace 115A and the fourth differential transducer trace 115D may physically cross over each other one or more times outside of the gimbal region 420 (e.g., in the tail region 425, as illustrated in FIG. 7A). Likewise, the second differential transducer trace 115B and the third differential transducer trace 115C may physically cross over each other one or more times outside of the gimbal region 420 (e.g., in the tail region 425, as illustrated in FIG. 7A).

Figure 7B:
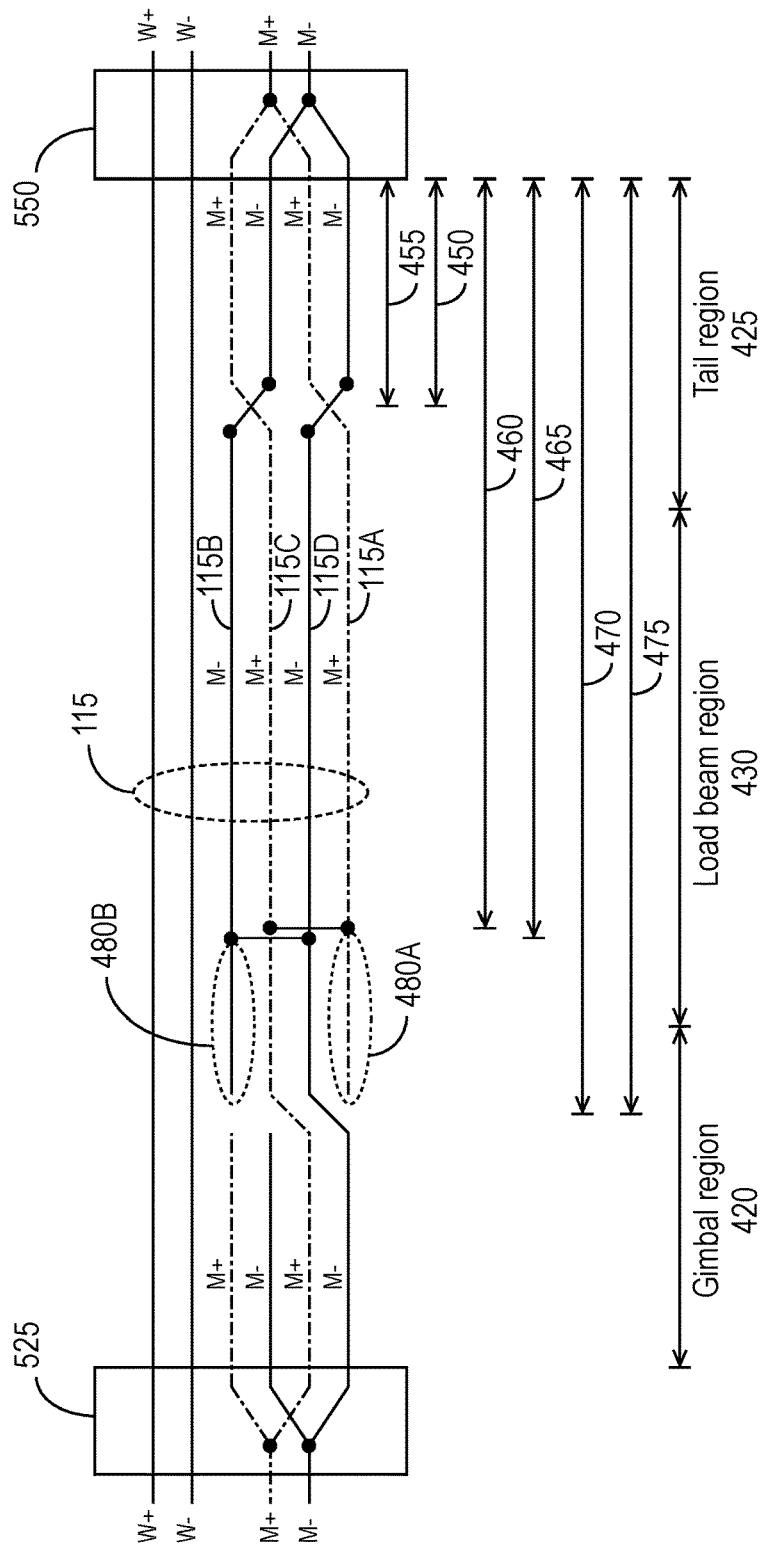
FIG. 7B illustrates another suspension assembly structure for a data storage device in accordance with some embodiments.

FIG. 7B illustrates another suspension assembly structure for a data storage device in accordance with some embodiments. The embodiment illustrated in FIG. 7B is similar to that shown in FIG. 7A, except that each of the write traces W+ and W− is split into two traces 115 (e.g., to lower the characteristic impedance for low-power operation).

Simulations indicate that the structures of FIGS. 7A and 7B can provide at least 13.5 dB of crosstalk attenuation.

FIG. 8A illustrates a suspension assembly 400 that includes virtual crossovers in the differential transducer traces M+ and M− in accordance with some embodiments. FIG. 8A shows the virtual crossovers 405 in the gimbal region 420 and the strapping (or stitching) 410 of the differential transducer traces M+ and M− in the load beam region 430.

FIG. 8B is a closer view of the gimbal region 420 and the virtual crossovers 405 of FIG. 8A.

Figure 9:
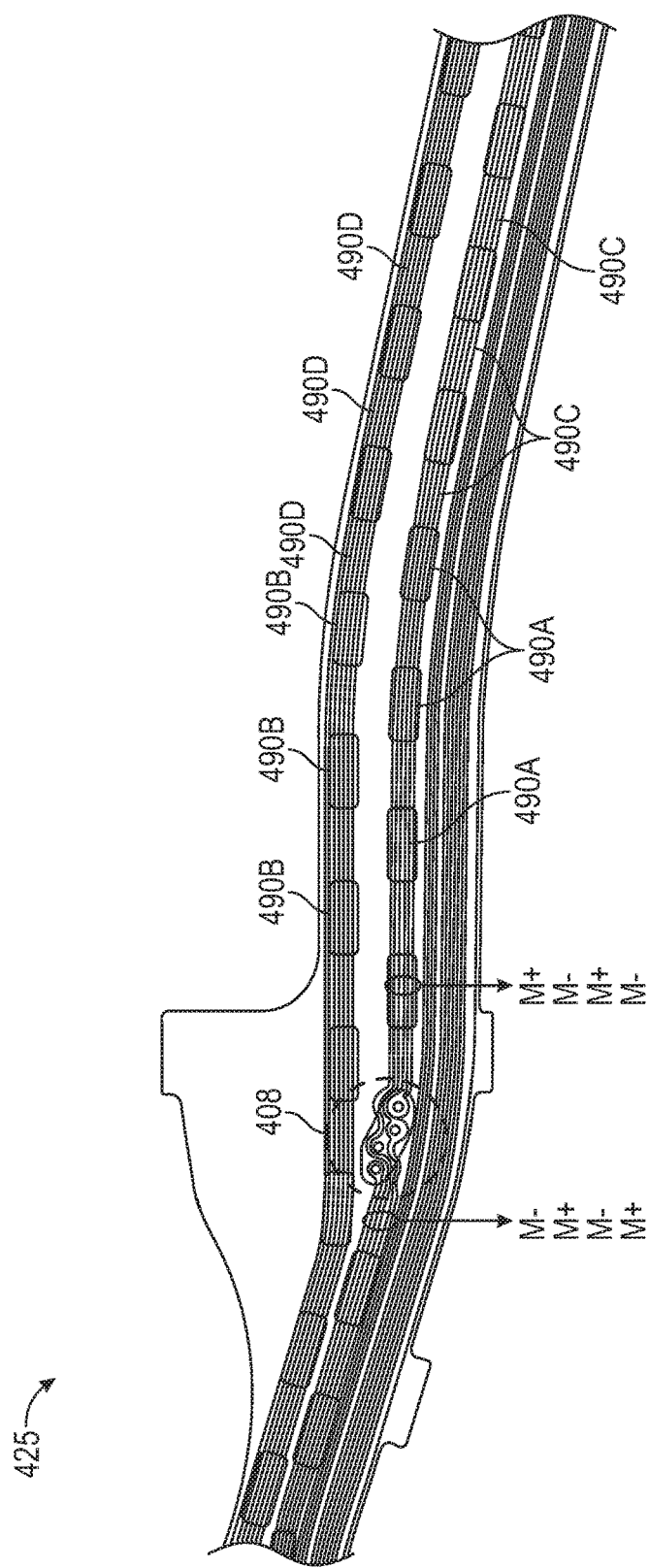
FIG. 9 illustrates the tail region of a suspension assembly structure in accordance with some embodiments.

FIG. 9 illustrates the tail region 425 of a suspension assembly structure in accordance with some embodiments. FIG. 9 shows the physical crossovers 408 in the differential transducer traces M+ and M− as well as how the polarities 490A, 490C of the differential transducer traces M+ and M− alternate, as do the polarities 490B, 490D of the write traces. (To avoid obscuring the drawing, only some of the polarities 490A, 490B are labeled.)

At least some of the embodiments disclosed herein are particularly advantageous when crosstalk cannot be filtered effectively by a capacitor, such as, for example, when the differential transducer traces M+ and M− carry a bias current to a STO, and the bias current has an AC component that would be effectively blocked by a capacitor.

It is to be understood that although the drawings and disclosure presume that the write traces W+ and W− cause crosstalk to the differential transducer traces M+ and M−, the disclosures also apply in situations in which the differential transducer traces M+ and M− cause crosstalk to the write traces W+ and W−. In general, the disclosures herein apply whenever a first pair of traces carrying a first differential signal suffer from crosstalk coupling into the first pair of traces from another source, where the crosstalk source may be a second pair of differential traces, a single-ended trace, or even a source from outside the suspension assembly structure altogether (e.g., radio-frequency interference from another component or circuit within the data storage device or a source external to the data storage device). Likewise, pairs of write traces W+ and W− and differential transducer traces M+ and M− may have physical and/or floating crossovers to improve the immunity of each pair of traces 115 to crosstalk from the other(s) and/or from other interference signals.

Furthermore, although the drawings herein typically illustrate only one or two crossovers (whether physical or virtual), in general, there may be any number of crossovers to provide a desired level of crosstalk mitigation. The positions of the crossovers along the suspension assembly may be selected depending on the amount of signal coupling in a particular phase. For example, if the inherent signal coupling is in one phase, it may be desirable to cancel more of the signal in the opposite phase. The number and placement of the crossovers may be selected (e.g., using computer simulations) depending on the inherent, unavoidable dominant coupling phase.

In the foregoing description and in the accompanying drawings, specific terminology has been set forth to provide a thorough understanding of the disclosed embodiments. In some instances, the terminology or drawings may imply specific details that are not required to practice the invention.

Although this document explains aspects of certain embodiments in the context of data storage devices, using hard disk drives as examples of data storage devices, the disclosures herein are not limited to use in data storage device applications. Specifically, the various embodiments are applicable to other electronic devices with crosstalk mitigation needs. Furthermore, although certain embodiments are explained in the context of hard disk drives, and some of the drawings show a hard disk drive as an example data storage device, the various embodiments are applicable to other data storage devices such as solid state drives, solid state hybrid disk drives, optical disk drives, tape drives, and the like.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used herein, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A suspension assembly structure for a data storage device, the suspension assembly structure comprising:
    a first trace for carrying a first component of a current to a differential transducer on a slider;
    a second trace for carrying a second component of the current to the differential transducer on the slider;
    third and fourth traces for providing a differential write current to a writer of the data storage device;
    a fifth trace for carrying the first component of the current to the differential transducer on the slider; and
    a sixth trace for carrying the second component of the current to the differential transducer on the slider,
    wherein:
        the first trace physically crosses over the second trace at a first distance from a tail of the suspension assembly structure,
        the fifth trace physically crosses over the sixth trace at a second distance from the tail of the suspension assembly structure, the first trace is connected to the fifth trace at a third distance from the tail of the suspension assembly structure, the second trace is connected to the sixth trace at a fourth distance from the tail of the suspension assembly structure, the first trace virtually crosses the second trace at a fifth distance from the tail of the suspension assembly structure, and the fifth trace virtually crosses the sixth trace at a sixth distance from the tail of the suspension assembly structure.

2. The suspension assembly structure recited in claim 1, wherein the first trace also physically crosses over the second trace at a seventh distance from the tail of the suspension assembly structure.

3. The suspension assembly structure recited in claim 1, wherein:
the differential transducer is a spin-torque oscillator (STO), and
the current is a STO bias current.

4. The suspension assembly structure recited in claim 3, wherein the STO bias current comprises an AC component.

5. The suspension assembly structure recited in claim 1, wherein:
the differential transducer is a read sensor, and
the current is a read sensor current.

6. The suspension assembly structure recited in claim 1, wherein:
the differential transducer is an embedded contact sensor or a thermal fly-height control element.

7. The suspension assembly structure recited in claim 1, wherein:
the first and second distances are substantially equal, and
the third and fourth distances are substantially equal.

8. The suspension assembly structure recited in claim 1, wherein the first and second distances are less than the third and fourth distances.

9. The suspension assembly structure recited in claim 1, wherein:
a length of the first trace is less than a length of the fifth trace, and
a length of the sixth trace is less than a length of the second trace.

10. The suspension assembly structure recited in claim 1, wherein the fifth and sixth distances are substantially equal.

11. The suspension assembly structure recited in claim 1, wherein the first, second, third, and fourth distances are less than the fifth and sixth distances.

12. A data storage device comprising:
the suspension assembly structure recited in claim 1; and
the slider comprising the differential transducer.

13. A suspension assembly structure for a data storage device, the suspension assembly structure comprising:
a gimbal region;
a load beam region;
a tail region; and
a plurality of differential transducer traces for providing a current to a differential transducer on a slider, the plurality of differential transducer traces including at least four traces,
wherein:
a first subset of at least two of the plurality of differential transducer traces is for carrying a first component of the current,
a second subset of at least two of the plurality of differential transducer traces is for carrying a second component of the current, the at least two of the plurality of differential transducer traces in the second subset being different from the at least two of the plurality of differential transducer traces in the first subset,
the first subset of the plurality of differential transducer traces physically crosses over the second subset of the plurality of differential transducer traces in the tail region,
the first subset of the plurality of differential transducer traces are strapped together in the load beam region,
the second subset of the plurality of differential transducer traces are strapped together in the load beam region, and
the first subset of the plurality of differential transducer traces virtually crosses the second subset of the plurality of differential transducer traces in the gimbal region.

14. The suspension assembly structure recited in claim 13, wherein:
the differential transducer is a spin-torque oscillator (STO), and
the current is a STO bias current.

15. The suspension assembly structure recited in claim 14, wherein the STO bias current comprises an AC component.

16. The suspension assembly structure recited in claim 13, wherein:
the differential transducer is a read sensor, an embedded contact sensor, or a thermal fly-height control element.

17. A data storage device comprising:
the suspension assembly structure recited in claim 13; and
the slider comprising the differential transducer.

* * * * *